(12) United States Patent  
Krishnan (10) Patent No.: US 7,003,649 B2  
(45) Date of Patent: Feb. 21, 2006

(54) CONTROL FORWARDING IN A PIPELINE DIGITAL PROCESSOR

(75) Inventor: Sivaram Krishnan, Los Altos, CA (US)

(73) Assignee: Hitachi, Ltd., Tokyo (JP)

(*) Notice: Subject to any disclaimer, the term of this patent is extended or adjusted under 35 U.S.C. 154(b) by 497 days.

(21) Appl. No.: 10/094,560

(22) Filed: Mar. 8, 2002

(65) Prior Publication Data

US 2003/0172258 A1 Sep. 11, 2003

(51) Int. Cl.  
*G06F 9/38* (2006.01)

(52) U.S. Cl. ...................... 712/213; 712/235
(58) Field of Classification Search ................ 712/213, 712/235, 241  
See application file for complete search history.

(56) References Cited

U.S. PATENT DOCUMENTS

| | | | | |
|---|---|---|---|---|
| 4,200,927 A | * | 4/1980 | Hughes et al. | 712/235 |
| 4,439,827 A | * | 3/1984 | Wilkes | 712/235 |
| 4,736,292 A | * | 4/1988 | Danilenko et al. | 712/234 |
| 4,742,451 A | * | 5/1988 | Bruckert et al. | 712/235 |
| 5,050,068 A | * | 9/1991 | Dollas et al. | 712/206 |
| 6,269,439 B1 | * | 7/2001 | Hanaki | 712/235 |

* cited by examiner

*Primary Examiner*—William M. Treat  
(74) *Attorney, Agent, or Firm*—Townsend and Townsend and Crew LLP (57) ABSTRACT

A data processor includes at least one instruction pipeline for executing an instruction stream having branch instructions. The choices of a branch instruction, the next inline instruction or a target instruction, are made available for selection by a control bypass signal that is generated during decode of the branch instruction.

9 Claims, 7 Drawing Sheets

| Cycle  | n | n+1 | n+2 | n+3 | n+4 | n+5 | n+6 | n+7 |
|--------|---|-----|-----|-----|-----|-----|-----|-----|
| CMP    | F | D   | E1  | E2  | E3  | S   |     |     |
| BR     |   | F   | D   | E1  | E2  | E3  | S   |     |
| Target |   |     | F   | D   | E1  | E2  | E3  | S   |

FIG_5

| Cycle | n | n+1 | n+2 | n+3 | n+4 | n+5 |
|-------|---|-----|-----|-----|-----|-----|
| BR.C  | F | D   | E1  | E2  | E3  | S   |
| Next  |   | F   | D   | E1  | E2  | E3  | S |

FIG_6A

| | n | n+1 | n+2 | n+3 | n+4 | n+5 | | |
|--------|---|-----|-----|-----|-----|-----|---|---|
| BR.C   | F | D   | E1  | E2  | E3  | S   |   |   |
| Bubble |   |     |     |     |     |     |   |   |
| Target |   |     | F   | D   | E1  | E2  | E3 | S |

FIG_6B

FIG_7

CONTROL FORWARDING IN A PIPELINE DIGITAL PROCESSOR

BACKGROUND OF THE INVENTION

The present invention relates generally to digital processor architecture, and more particularly to a mechanism for reducing branch penalties in a pipelined digital processor.

Performance enhancements of digital processors include a variety of techniques and designs. Use of small, fast memories (i.e., cache) for alleviating bottle necks occurring from main memory accesses is an example of one such technique. Another is to design an instruction execution unit using the concepts of parallel processing to overlap instruction execution tasks. The design of such instruction execution units, typically referred to as "pipeline" designs, usually includes, at a minimum, fetch, decode and execution stages. Pipeline designs allow instructions to be executed in the sequence in which they appear in memory, but allow a new instruction to begin the fetch, decode, and execute phases before an earlier instruction has completed those phases. This form of parallelism can substantially improve performance, but not without certain difficulties.

Optimum performance of digital processors with pipeline designs require that the pipeline be kept full. If an input stage is idle on a particular cycle, this idleness will eventually promulgate through the entire pipeline to detract from pipeline efficiency. One such obstacle to optimal performance of a pipelined digital processor arises when an instruction has a dependence upon data or an operand of a prior instruction occurring close enough together in the instruction sequence to raise the possibility of an inconsistent result. One approach to overcoming this obstacle referred to as "data bypass," "data forwarding," or "operand forwarding, which involves passing data to its eventual user before it would be available through normal data paths of the processor.

Another obstacle to optimal performance has been conditional branches, which have long been a bane of pipeline design because they can temporarily halt a pipeline until the branch target can be determined. Popular approaches to alleviating this problem include delayed branching and branch prediction. Briefly, the concept behind delayed branching is to introduce the branch instruction into the pipeline followed by the next inline instruction that is to be executed for the instruction stream before the branch is taken. This allows the branch instruction to begin set up procedures to determine the branch while the final instruction of the block is executed.

Branch prediction is an estimate of which branch path will be taken. Based upon the estimate, a branch to the estimated instruction stream is made. If the estimate is not correct, the estimated instruction stream must be removed in favor of the correct instruction stream. When such estimates are mostly correct, branch prediction can be very effective.

Generally, branch instructions are of two different types: simple or complex. A simple branch instruction is typically one in which the condition upon which the branch is determined is known just before or during decode. An unconditional branch is of this type, as are branch instructions that are preceded by some form of a compare instruction. Complex branch instructions are ones in which the condition upon which the branch will be taken is not known until the branch instruction is actually executed. The penalties imposed by complex branch instructions can be exacerbated when the depth of the pipeline is increased in order to operate digital processors at higher clock speeds, although the penalty can be alleviated to some extent by branch prediction.

Branch prediction can be complex, and expensive to design and test. The performance benefits achieved by branch prediction is dependent upon the effectiveness of the prediction algorithm(s) used, many of which employ relatively large amounts of storage and complex hardware that can be quite expensive.

Accordingly, a technique to reduce branch penalty without complex branch prediction would be of significant advantage to the design and operation of high speed digital processors using pipeline design technique.

BRIEF SUMMARY OF THE INVENTION

The invention is described in the context of a digital processor having an execution unit that employs the parallelism of a pipeline design. Typically, a branch instruction will transfer to one of two (or sometimes more) instructions based upon some condition. The present invention takes advantage of the fact that the locations (i.e., addresses) of two instructions that will follow a branch are known before the branch which selects between the two is taken. The control signal representing the branch decision produced by the branch instruction is, therefore, forwarded at the earliest possible moment to select between the two instructions for application to the pipeline to effect the branch.

The invention applies techniques similar to those used in data bypass. Data bypass techniques rely on the fact that the data dependency between the two instructions, a prior instruction in an instruction stream and a later instruction, is known when the later instruction is being decoded. Both registered data and the data made available by the prior instruction is applied to, for example, a multiplexing function. If the subsequent instruction can use the registered data, that data is selected and provided by the multiplexing function. If, however, use the of register will produce inconsistent result, possibly because it has not yet been written with the correct data, the data produced by the prior instruction is selected by the multiplexing function and used to "bypass" the register and made available. Data bypass techniques rely on the fact that the data value is known ahead of time.

The present invention, therefore, takes advantage of the fact that the instructions between which a branch chooses are known ahead of time; it is the selection that is not known until the branch condition is computed. Thus, according to the present invention, the two instructions between which the branch must decide are and applied to a multiplexer. The selection made by the multiplexer is controlled by a bypass control signal that is produced when the condition upon which the branch instruction is based is known. For simple branch instructions, that condition will be made known during the decode stage of the pipeline and, therefore, is used to select the appropriate instruction for application to the pipeline. For complex branch instructions, the bypass control signal will be produced by the first execution stage, necessitating at least one cycle of delay.

In an alternate embodiment, the one cycle delay produced by complex instructions can be minimized by providing partial decode of the two instructions, and multiplexing the partial decoded instruction to the input of the pipeline.

Among the advantages achieved by the present invention is that branch penalties heretofore encountered can be alleviated. Further, if pre-decoding or partial decoding of the target instruction is necessary, this can result in only a minimal addition of circuitry. While a second decoder adds some complexity to the hardware, it is most likely to involve replication of the original decode logic. Use of a branch predictor needs a complete new design.

These and other advantages of the present invention will become apparent to those skilled in this art upon reading of the following detailed described of the invention, which should be taken in conjunction with the accompanying drawings.

DETAILED DESCRIPTION OF THE INVENTION

Before proceeding to a discussion of an embodiment of the invention, an explanation of the terminology used will aid in understanding following description of the invention. First, branch instructions are followed by either the "target" instruction, if the branch is taken, or the "next inline" instruction if the branch is not taken. Second, a branch instruction will either be a "simple" branch instruction or a "complex" branch instruction. Simple branch instructions are those in which the decision of the branch will depend upon some condition that has either been previously determined (e.g., by a compare instruction), is implicit in the branch instruction (e.g., an unconditional branch). A complex branch instruction is one in which the branch decision is made during execution of the branch instruction (e.g., the compare operation is part of the branch instruction) With this terminology in mind an embodiment of the invention can now be described.

Figure 1:
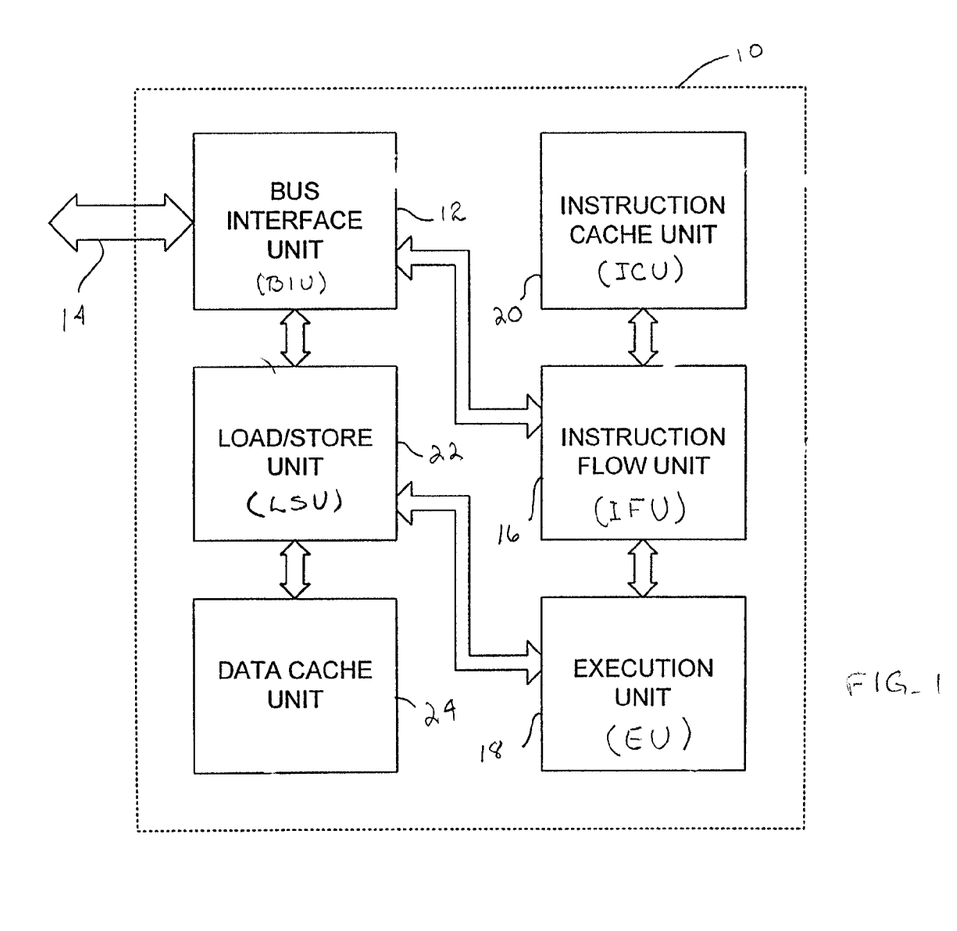
FIG. 1 is a block diagram, broadly illustrating a digital processing architecture for use with the present invention.

Turning now to FIG. 1, there is illustrated in block diagram form, a digital processor system 10 which may be described as a collection of processes or modules or functional units communicating via defined interfaces. Each of functional units may comprise large collections of circuitry whose properties are somewhat loosely defined, and may vary in size or composition significantly. These functional units, discussed in greater detail below, perform the function of fetching instructions and data from memory, preprocessing fetched instructions, scheduling instructions to be executed, executing the instructions, managing memory transactions, and interfacing with external circuitry and devices (not shown).

As FIG. 1 illustrates, the digital processor system 10 includes a bus interface unit (BIU) 12, which operates to handle requests to and from a system bus 14 which would connect to a main memory (not shown). An instruction flow unit (IFU) 16 is the front end of the processor system pipeline and controls fetch, predecode (if used), decode, issue, and branch operations. An execution unit (EU) 18 performs operations such as floating point and/or integer math, bit shift and shuffle operations, and other data operations and manipulations necessary to handle integer and multimedia instructions. The main processor data path includes an instruction cache unit (ICU) 20.

In addition, a load/store unit (LSU) 22 handles all memory instructions, and data cache control unit (DCU) 24 manages a data cache (not shown) and a data translation lookaside buffer (not shown). In a typical embodiment, the functional units shown in FIG. 1 may be integrated in a single integrated circuit, although the specific components and integration density are a matter of design choice selected to meet the needs of a particular application.

Figure 2:
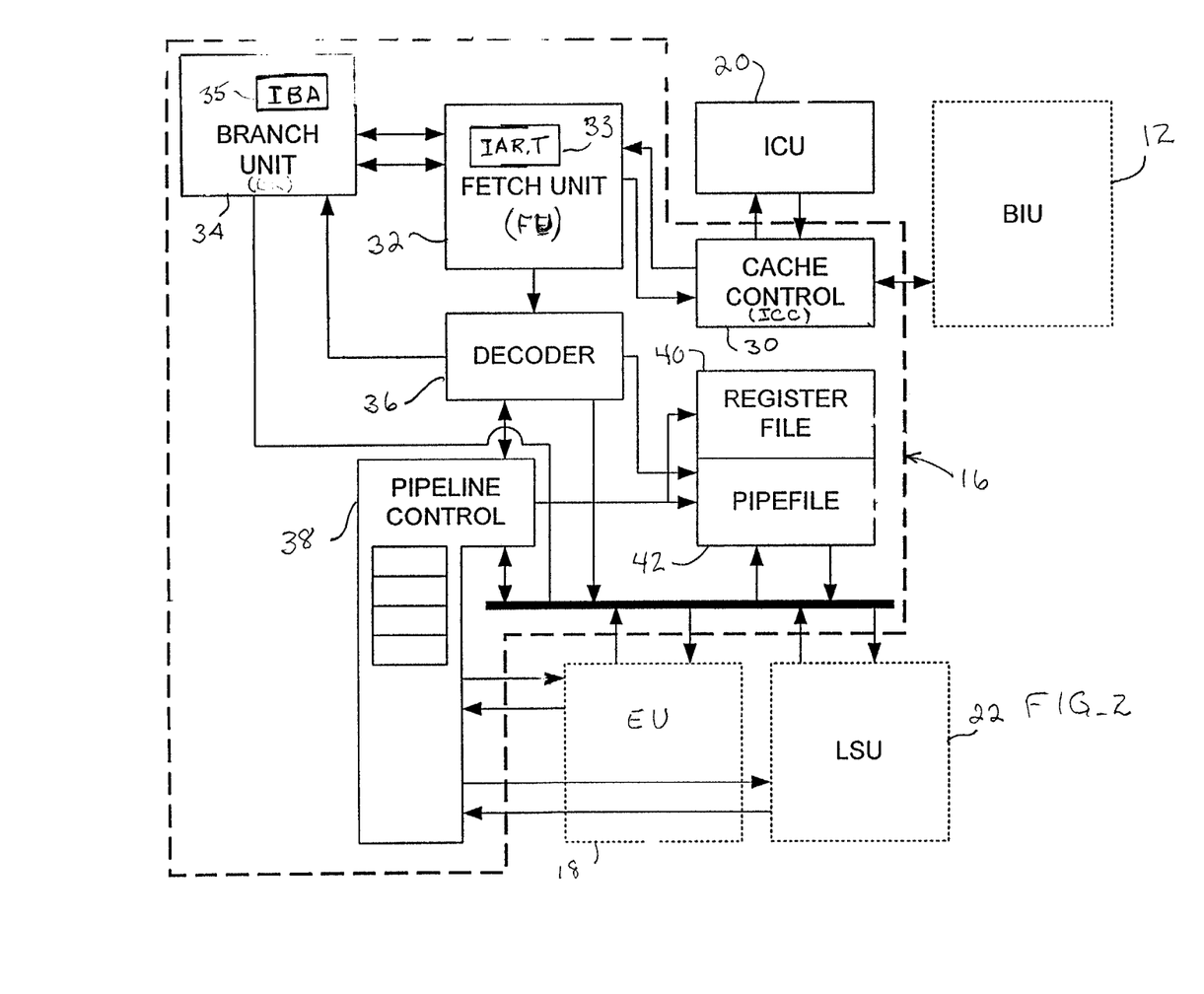
FIG. 2 is a block diagram of the instruction flow unit of FIG. 1.

FIG. 2 that illustrates shows a simplified block diagram the hardware resources that implement the IFU 16, including the internal blocks as well as the external interfacing units. As FIG. 2 shows, the IFU 16 can be divided into the following functional blocks, according to their operation: the instruction cache control unit (ICC) 30, the fetch unit (FE) 32, the branch unit (BR) 34, the decode unit 36, the pipeline control unit 38, and register file 40 and pipe file 42.

The IFU 16 functions to coordinate the flow of instructions and data within the processor system 10. Its main functions are to fetch instructions from the ICU 20, using fetch unit 32, and to decode the instructions in the decoder 36. The IFU 16 checks for instruction enter-dependency, reads operands from the register file 40, and sends the decoded instructions and the operands to the execution units (e.g., EU 18 and LSU 22). Additionally, the IFU 16 is coupled to the BIU 12 for access to external or main memory (not shown) via the system bus 14 (FIG. 1), in order to fill the instruction cache within (ICU) 20 with more instructions in the event of a cache miss.

Because of the sequencing role within the digital processor system 10, the IFU 16 will couple to almost every other functional unit. The interface between the IFU 16 and the BIU 12 will initiate instruction loading into the instruction cache. The interface between the IFU 16 and the ICU 20 provides the instruction flow for decoding and execution. The interface between the IFU 16 and EU 18 and LSU 22 provides the paths for sending and receiving instructions, operands, results, and well as the control signals, including those in connection with the present invention, as will be described below, to enable the execution of instructions. In addition to these interfaces, the IFU 16 may also receive various external interrupt signals from an interrupt controller (not shown) which samples and arbitrates between the received external interrupts, and with any internal exceptions, to activate the appropriate handler.

The pipe file 42 operates to collect results from the execution units, and writes them back to the register file 40. Once instructions are decoded, the pipeline control unit 38 will see to their application to the pipeline, and monitor their execution through the remaining pipeline stages. The main function of the pipeline control unit 38 is to insure that instructions are executed smoothly and correctly and that (i) instructions will be held in the decoder 36 until the source operands are ready or can be ready when needed, (ii) that synchronization and serialization requirements imposed by the instruction as well as internal/external events are observed, and (iii) that data operands/temporary results are forwarded correctly.

Preferably, the digital processor system 10 uses a "prepare-target" (PT) instruction to calculate the target instruction address. When a PT instruction is decoded, the BR 34 sends the content of the program counter (not shown) to the EU 18 for calculation of the target address. The result is stored in an inline buffer area (IBA) 35 of the BR 34. Later, when the BR 34 is otherwise idle, the target address is sent to the FE 32, which uses the target address to preload a target instruction buffer (IAR.T) 33 with the target instruction. The BR 34 processes decoded branch instructions from the decoder 36, retrieves branch conditions from the EU 18, and changes the locus of the instruction execution by directing the FE 32 to a different fetch address. The BR 32 also handles instructions that require access to the program counter (not shown) and ICC 30.

Figure 3A:
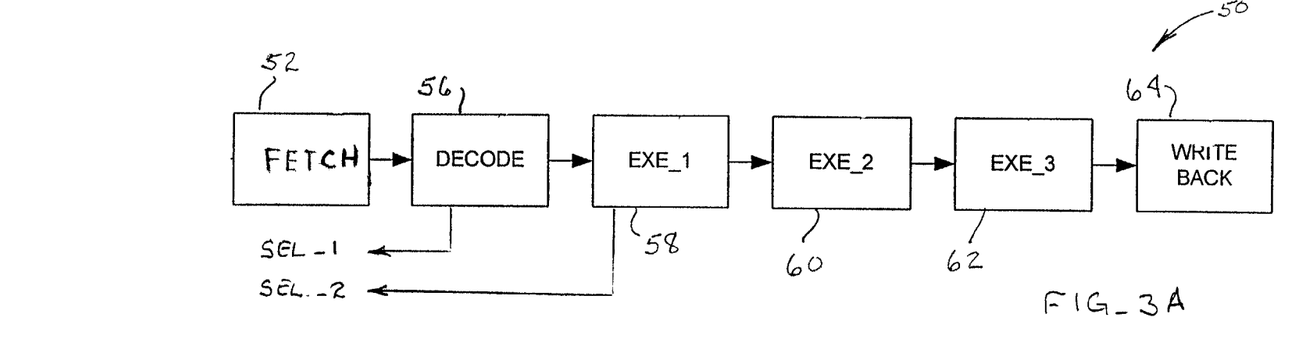
FIG. 3A is a conceptual diagram of the pipeline design used in the digital processor of FIG. 1.
Figure 3B:
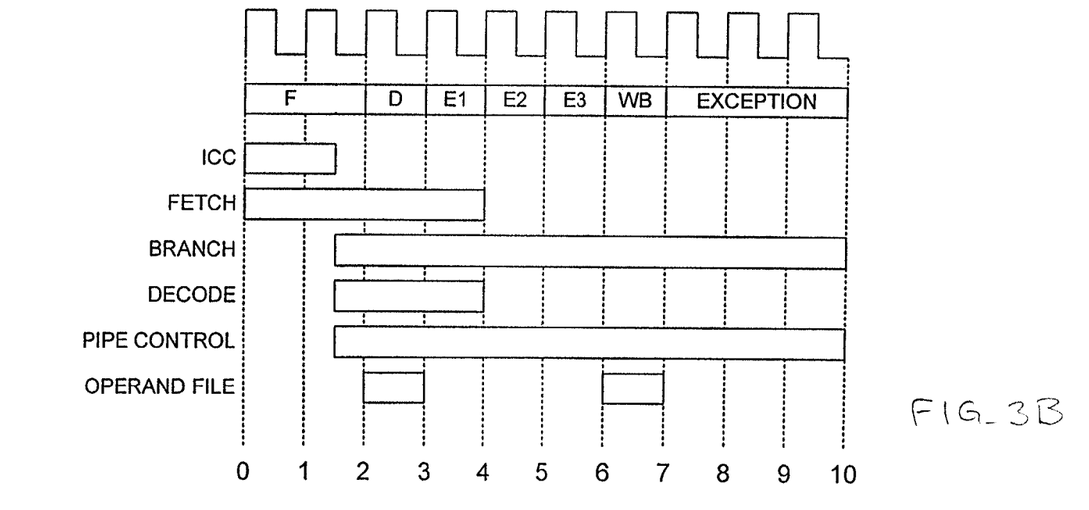
FIG. 3B is a timing diagram, illustrating operation of the pipeline design shown in FIG. 3A.

Turning now to FIGS. 3A and 3B, there is illustrated an example execution pipeline structure to incorporate the present invention. The particular example is a scalar (i.e. single pipeline), single issue architecture. The implementation shows three execution stages (EXE-1, EXE-2, and EXE-3), although more or less execution stages may be used. Many instructions execute in a single cycle. The present invention implements features to enable comprehensive forwarding of branch instruction control to achieve a high instruction throughput.

As FIG. 3A illustrates, the pipeline, designated generally with the reference numeral 50, includes seven stages: a fetch stage 52, a decode stage 56, three execution stages 58, 60, 62, and a writeback stage 64. The fetch stage 52 operates to perform the fetch operation, via the FU 32 (FIG. 2) to sequentially request instructions from the ICU 20 and order them for application to the first stage of the pipeline 50, the decode stage 56. (It may be useful to predecode the instruction, and if so, the first stage of the pipeline 50 may include a predecode stage.)

The decode stage 56 handles the full instruction decode (if no pre-decoding is implemented), as well as operand dependency checks and register file read and instruction issue to the execution units. It is also within the decode stage that certain branch instructions (i.e. "simple" branch instructions, as described more fully below) are detected to generate a bypass control signal according to the present invention (SEL-1") that is communicated to the FU 32 (FIG. 2). The FU 32 can then prepare to provide a target address or the next inline address for the branch instruction in the manner described below.

The first execution stage 58 performs the execution of all single cycle integer instructions, as well as the address calculation for memory and branch instructions. The second execution stage 60 implements the second cycle of execution for all multi-cycle integer/multimedia instructions. Additionally, it corresponds to the second cycle for load instructions. The third execution stage 62 implements the third cycle of execution for all multi-cycle integers/multimedia instructions and is a completion stage for load instructions. Writeback stage 62 is where all the architectural state modified by an instruction (e.g., general purpose registers, program counter, etc.) is updated. The exception status of the instruction arriving at this stage of any exception can prevent the update in this stage.

Digressing for the moment, as explained above branch instructions typically are of two types: simple or complex. Simple branch instructions base the decision of which flow path to take upon a preestablished or predetermined condition. These instructions are typically preceded by some form of compare instruction which establishes the condition that will be used. Complex instructions, on the other hand, typically include the compare operation. The determination of which flow path will be chosen by a simple branch instruction can be made at the decode stage. Complex branch instructions, however, require the branch condition to be determined at a first (or later) stage of execution. FIG. 3A shows the branch condition being resolved by the first stage of execution EXE-1 58 to produce the necessary bypass control signal ("SEL-2") that is communicated to the FU 32 for instruction selection. This is illustrated in FIG. 4, which diagrammatically represents the functional features of the invention.

Figure 4:
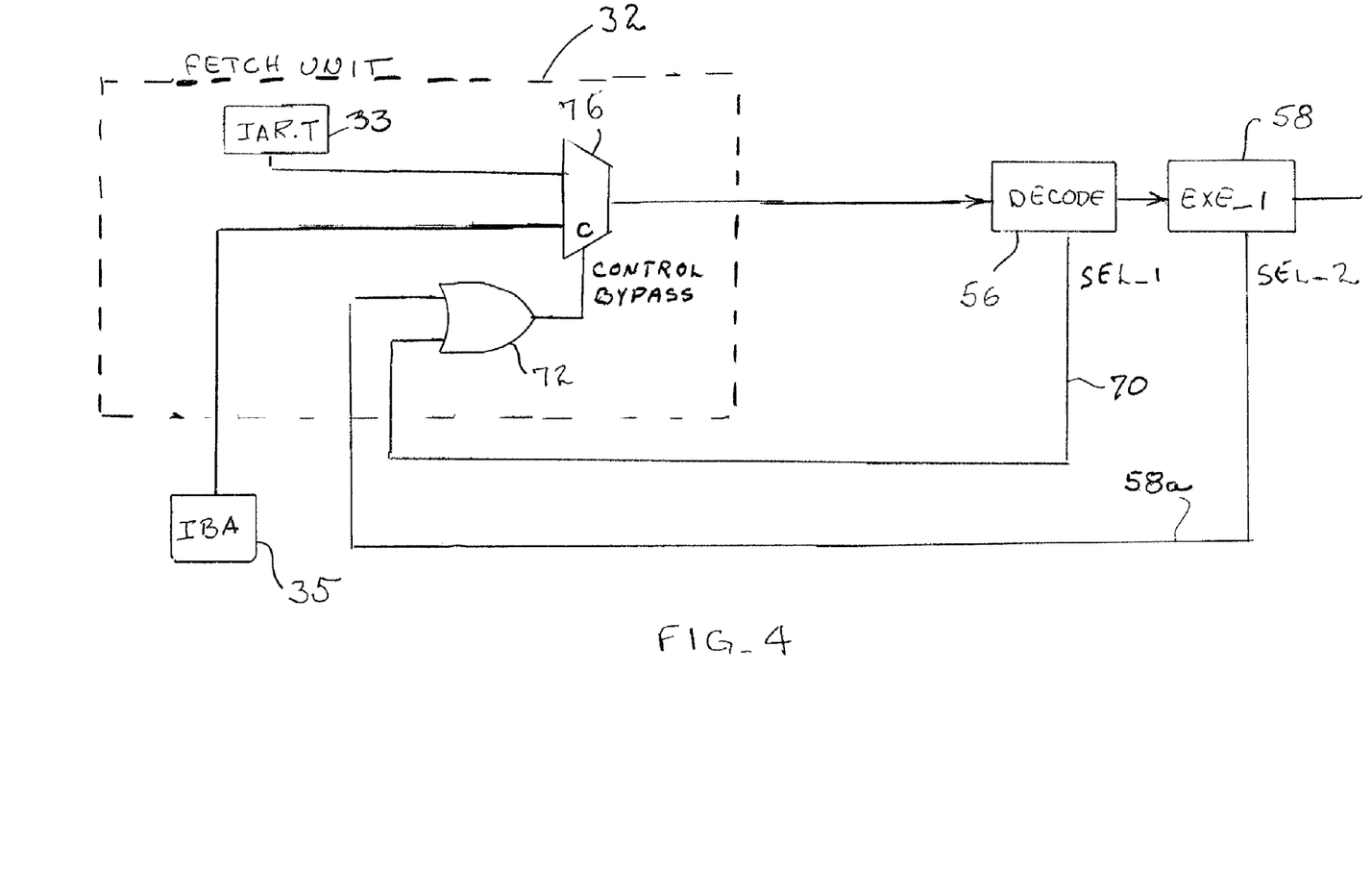
FIG. 4 is a diagrammatic representation of the forwarding structure used to select a branch path, using a single decoder, according to the present invention.

Turning to FIG. 4, a signal line 70 carries the bypass control signal (SEL-1) from the decode stage 56 to an input of OR gate 72 contained in the FU 32. Similarly, the second bypass control signal (SEL-2) is carried by a signal line 74 from the EXE-1 stage 58 to a second input of the OR gate 72. The output of the OR gate 72 is a control bypass signal that is applied to the control (C) of a multiplexer 76 which also receives, as inputs, the content of the IAR.T register 33 (the target instruction) and the inline buffer area (IBA) 35 (containing the next inline instruction). When either of the SEL-1 or SEL-2 signals are asserted, the OR gate 72 will create the control bypass signal to cause the multiplexer 74 to select the target instruction contained in the IAR.T register 33. If neither of the SEL-2, SEL-2 signals are asserted, the control bypass signal will not be asserted, and the multiplexer 74 will select the next inline instruction contained in the IBA 35. Thus, the outcome of the branch instruction is used to select one of the two available instructions: the target instruction or the next inline instruction.

Figure 5:
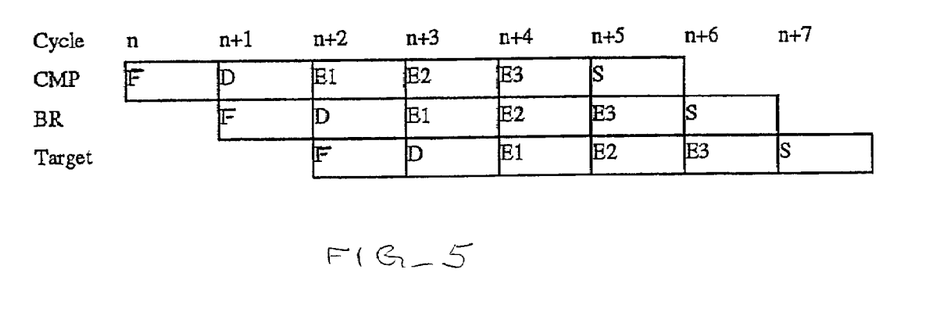
FIG. 5 is an illustration of a pipeline timing diagram, illustrating path selection according to the present invention in response to simple branch instructions.

A timing diagram illustrating the operation of the invention for simple instructions is illustrated in FIG. 5. As FIG. 5 shows, at some time prior to fetching a branch instruction (BR) a compare instruction (CMP) is fetched (cycle n), decoded (cycle n+1), and executed during the cycle n+2. The result of the CMP instruction is available in the n+2 cycle through bypass.

While the CMP instruction is being decoded, or subsequently thereto, the BR instruction is fetched (cycle n+1) and, during the next cycle (n+2) applied to the decode stage. Since this is a simple branch instruction, the branch outcome is known when the branch instruction is in the decode stage and, therefore, the SEL-1 signal may asserted (if the test condition so indicates) to select the target instruction from the IAR.T register 33. If the SEL-1 signal is not asserted, the content of the inline buffer area 35, the next inline instruction, is selected. The selected target or next inline instruction is then applied to the decode stage 56. For these types of branches, no branch prediction is necessary.

Complex branch instructions are a bit more difficult, because the branch outcome is known only when the instruction is in the first EXE-1 stage 52 (FIG. 3A). Thus, even though a target instruction is available, a delay of at least one cycle may be required.

Figure 6A:
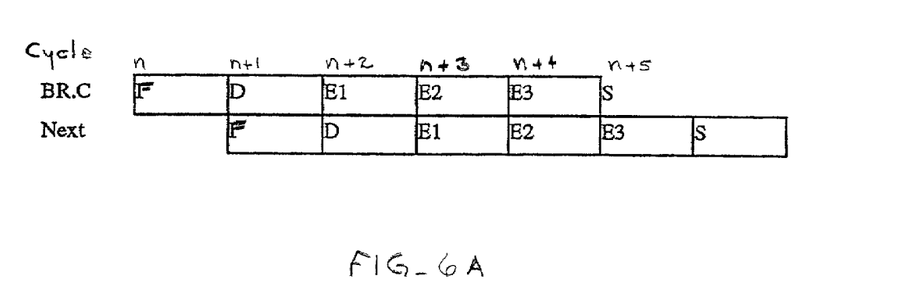
FIGS. 6A and 6B are a representative pipeline timing diagrams respectively illustrating selection of a branch path according to the present invention based upon complex folded branch instructions using branch prediction.
Figure 6B:
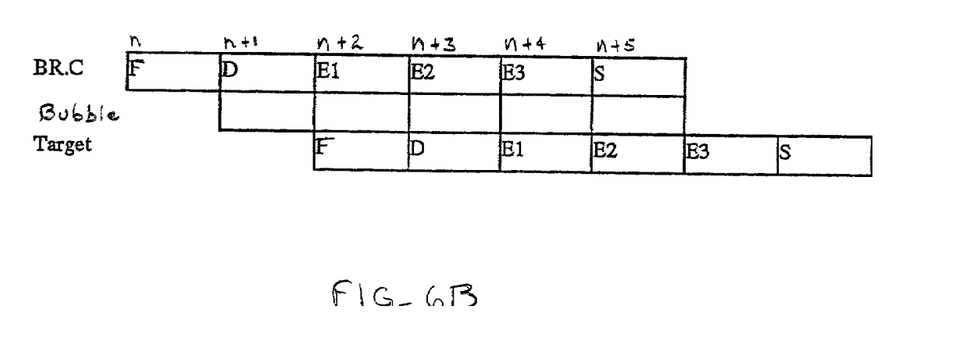

FIGS. 6A and 6B, respectively, illustrate execution of a complex branch instruction with prediction that is correct (FIG. 6A) and not correct (FIG. 6B). The complex branch (BR.C) may use either static or dynamic branch prediction. Referring to FIG. 6A, the BR.C instruction is fetched in cycle n and decoded in cycle n+1. Since the necessary condition (i.e. compare operation) is included in the branch instruction, it cannot be determined until the branch instruction is executed, typically only in the first (EXE-1) stage 58. However, while the BR.C is being decoded during the cycle n+1, the decode stage can detect the prediction and fetch the predicted next instruction (i.e., either the next inline instruction or the target instruction) and respectively load them in the IAR.T 33 register or the inline buffer area 35.

In the cycle n+2, the BR.C instruction is executed in the EXE-1 pipeline stage 58 to determine the flow path and, the prediction being correct in this example, the SEL-2 signal asserted (or not asserted, as the prediction directs) to select the predicted next instruction via the MUX 76.

In the event the prediction is not correct, there will be a one cycle delay as FIG. 6B illustrates. FIG. 6B shows a bubble (no operation or NOP instruction) inserted in the pipeline to will follow the BR.C instruction to allow time for determining which flow path to take. That determination is then made, resulting in assertion or non-assertion of the SEL-2 signal, during the EXE-1 pipeline stage 58. Again, that determination will select one of the IAR.T register 33 or inline buffer area 35 for fetching as the next or target instruction, that is then applied to the decode stage during the cycle n+3.

As can be seen, even in the worst case, there is only one bubble, i.e., the branch penalty under misprediction is only one. So even if there was no branch prediction, the penalty is no worse than one cycle.

Using branch prediction, however, and the branch prediction is taken, the target decode can take place one cycle earlier.

It may be that the particular design of the digital processor system 10 is such that the control signal for simple branch instructions, SEL_1, is asserted late in the decode stage 56 of the pipeline 50. If so, there may not be enough time available to decode the next instruction (inline or target) with the cycle following the decode of the branch instruction. In such a case, predecode circuits may be added in the paths between the IAR.T register 33 and inline buffer area 35, on the one hand, and the multiplexer 76 on the other to partially or fully decode both the inline and target instructions. While adding this additional will increase the complexity of the hardware, it is likely to be substantially simpler than the hardware needed for a branch predictor. In addition, a second decoder will involve replication of the original decode logic whereas a branch predictor will require a completely new design, although there will be needed additional logic to handle the control bypass. And, while the particular predecoding design implemented can vary widely, according to particular needs, two examples of predecoding are illustrated by FIGS. 7 and 8.

Figure 7:
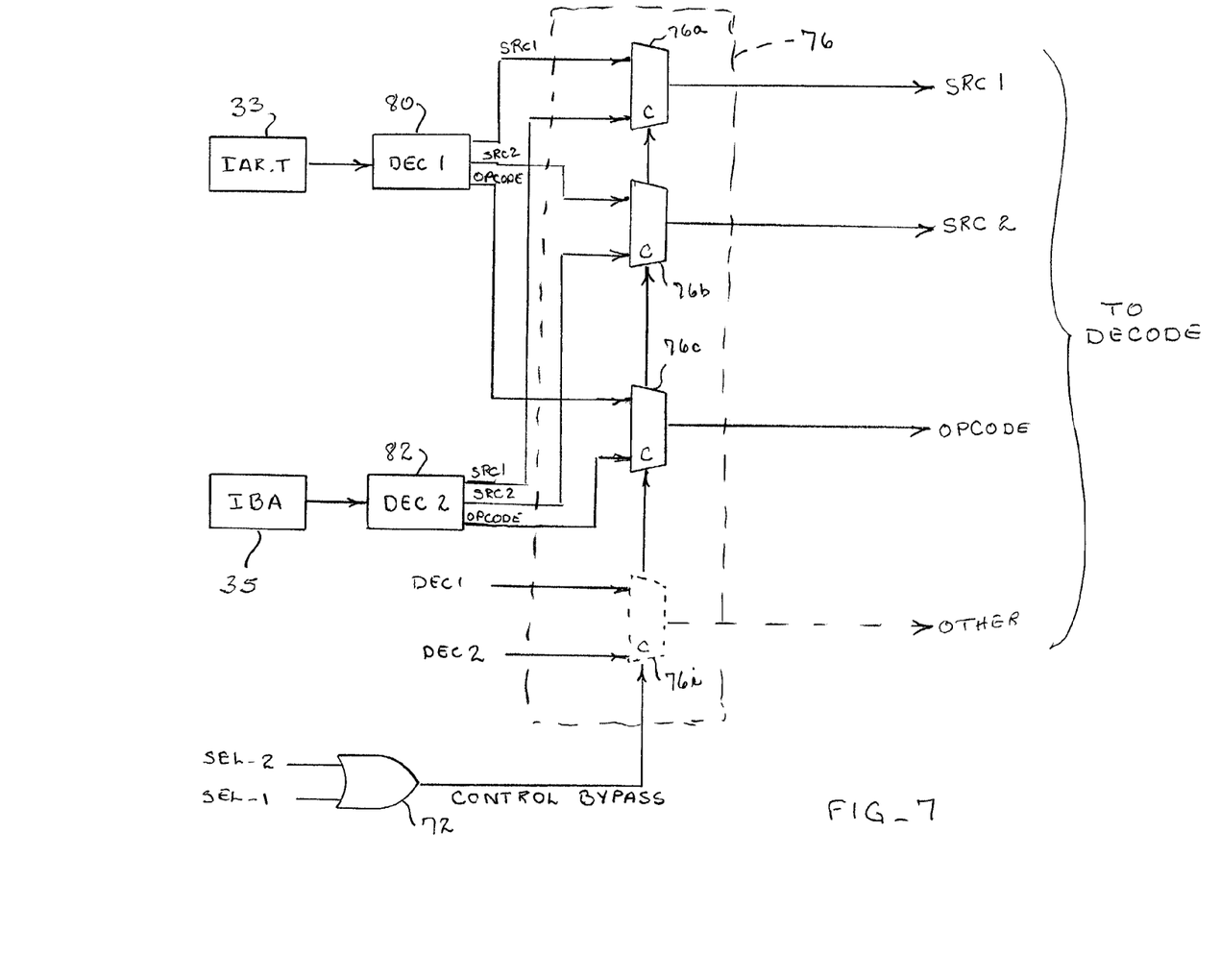
FIG. 7 is an illustration of one predecoding example.

Turning first to FIG. 7, there is illustrated predecoding implemented by decoders 80 (for the target instruction) and 82 (for the next inline instruction). The decoders 80, 82 respectively receive the content of the IAR.T 33 and IBA 35 to extract from each corresponding instruction the identifications (SRC1, SRC2) of the source registers containing operands that will be used by such instruction, together with the operational code (OPCODE) for execution. In order to accommodate the predecode design of this example, the multiplexer 76 is restructured to include three two-input multiplexers 76A, . . . , 76C. Input selection of the multiplexers 76 is controlled by the state of the control bypass signal generated by the OR gate 72 as before. The state of the control bypass signal will select the source addresses and OPCODE of either the target instruction or the next inline instruction, depending upon the condition of the branch.

FIG. 7 also shows, in phantom, an additional multiplexer 76I to represent selection of additional predecode values that may be desired or needed.

Figure 8A:
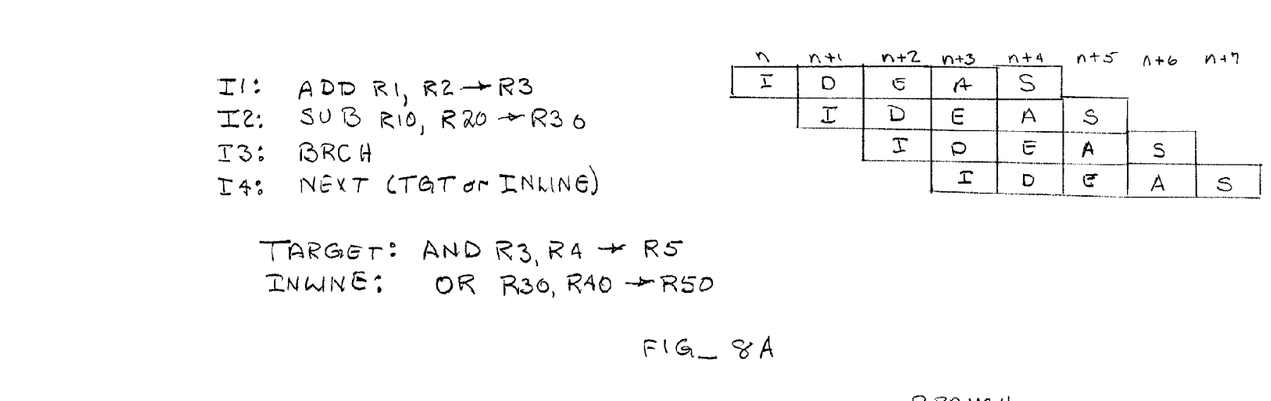
FIG. 8A illustrates an instruction stream together with an execution diagram for each instruction.

Turning now to FIG. 8, a somewhat different type of predecoding, for data bypass forwarding, is shown. FIG. 8A illustrates a portion of an instruction stream comprising four instructions (I1, I2, . . . , I4). Also shown in FIG. 8A are the stages of the execution pipeline that each instruction will pass through during the cycles n, n+1, . . . , n+7. (For the sake of simplicity, FIG. 8A illustrates an execution pipeline having only five stages: I (instruction fetch), D (instruction decode), E (execution), A (memory access), and S (save or writeback) as opposed to the six stages shown in FIGS. 3B, 5, and 6. It will be evident to those skilled in this art, however, that use of the present invention is not necessarily dependent upon the number of stages of the execution pipeline.

The first instruction I1 is shown as an ADD instruction that includes the addresses of registers (R1, R2) containing the source operands for the ADD operation. The Add instruction also includes the register address (R3) at which the result will be stored. Similarly, the second instruction, I2, a subtract (SUB) instruction includes the register addresses (R10, R20) for the source operands, and of the register address (R30) for the result.

Instruction I3 is a branch instruction, followed by the first instruction of the selected branch path: a target instruction, if the branch is taken, or a next inline instruction, if the branch is not taken. The target instruction is shown as an AND operation between the contents of registers R3 and R4. The result of the AND operation will be stored in the register identified by the address R5. Alternatively, the next inline instruction is an OR operation that will be performed on the contents of the registers identified by the addresses R30, R40, and the result of that operation will be placed in the register addressed R50.

Figure 8B:
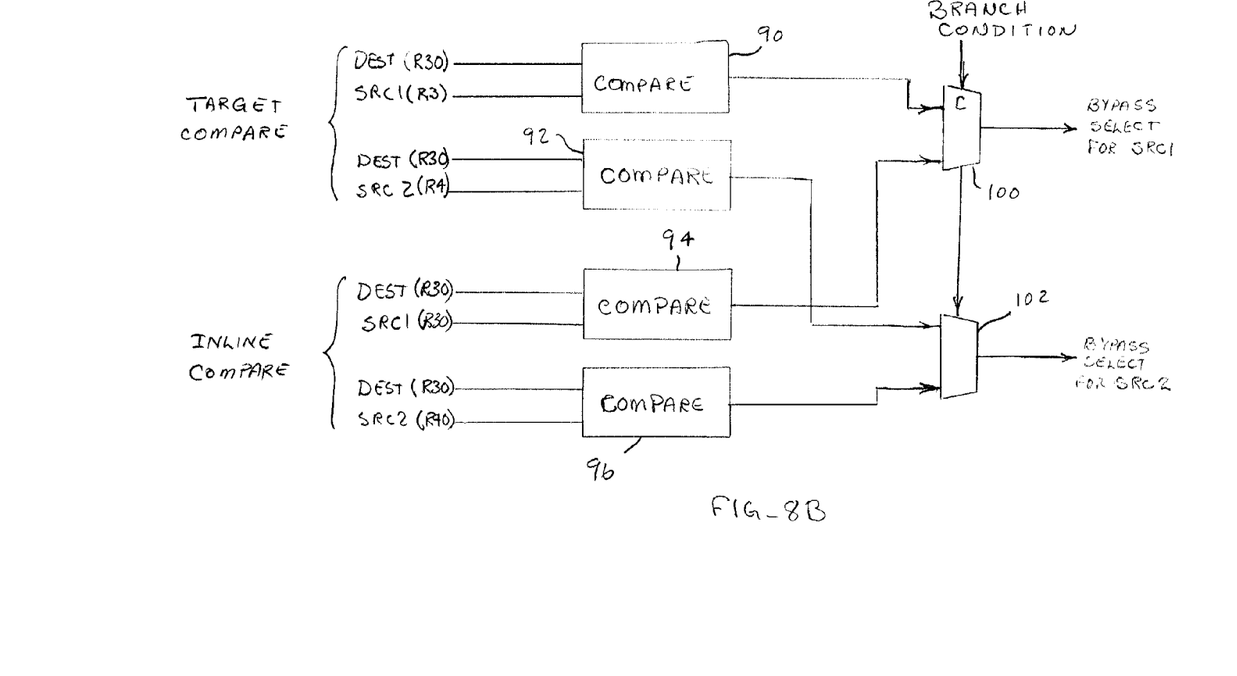
FIG. 8B illustrates a predecode example that checks for and provides data forwarding for the instruction stream of FIG. 8A.

The bank of comparators (90, 92, . . . , 96) determine whether or not the selected instruction following the branch instruction (I3), i.e., the target instruction or the next inline instruction, needs a data bypass. The comparators 90–96 operate to perform predecoding by comparing (1) the register addresses of operands that will be used by the target and next inline instructions when one of the two instructions is selected and in the decode (D) stage with (2) the register address that will be written during the memory access stage of the same cycle. Thus, as FIG. 8A indicates, the instruction selected by the branch, either the target instruction or the next inline instruction, will be applied to the decode (D) stage of the pipeline during the cycle n+4, and at the same time the SUB instruction (instruction I2) will be in the memory access stage (A) to access the memory register with the address of R30. Thus, the comparators 90 and 92 will compare the register addresses that contain the operands for the target instruction (R3, R4) with the address of the register that will be accessed by the access stage (register R30). Similarly, the comparators 94, 96 will perform the same comparison. Note that, if the target instruction, and the AND instruction using the registers R3, R4, is selected, there is no match; that is, the source registers used by the target instruction (R3, R4) are not being written during the access stage for instruction I2. However, if the inline instruction is selected, the comparator 94 will detect the fact that a register containing one of the operands needed for OR function, register R30 will be written during the n+4 cycle in A stage execution of instruction I2. Accordingly, the branch instruction will operate the multiplexers 100, 102 to form a data bypass signal for the source register R30 to forward it to the OR instruction in the decode or execution stages D, E.

What is claimed is:

1. A method of selecting one of two branch instruction paths for application to an execution unit of a digital processor in response to a branch instruction, a one and another of the two branch instruction paths having as a first instruction a target instruction and a next inline instruction, respectively, the method including the steps of:
   - storing target instruction and the next inline instruction, and at least partially decoding the target instruction;
   - producing a selection signal from decode of a branch instruction;
   - using the selection signal to select the target instruction or the next inline instruction; and
   - applying the selected target instruction or next inline instruction to the execution unit.

2. The method of claim 1, wherein the storing step including at least partially decoding next in-line instruction.

3. The method of claim 1, wherein the storing step including at least partially decoding target and next in-line instructions.

4. The method of claim 3, wherein the applying step includes applying the selected partially decoded target or next in-line instructions to the execution unit.

5. A digital processor operating to decode and execute instructions, including compare and branch instructions, the digital processor comprising:
   - storage for holding a target instruction and a next in-line instruction;
   - a selector element coupled to the storage to receive the target instruction and the next in-line instruction;
   - an execution pipeline having a decode stage to receive and decode the compare instruction to produce a branch condition and then receive and at least partially decode the branch instruction to assert a bypass control signal that is coupled to the multiplexer to select the target instruction or the next in-line instruction for input to the execution pipeline when the condition is true; and
   - wherein a first conditional branch instruction, when applied to the decode stage, causes the bypass control signal to be asserted.

6. A digital processor operating to decode and execute instructions, including compare and branch instructions, the digital processor comprising:
   - a first storage for holding a target instruction;
   - a second storage for holding a next in-line instruction;
   - a multiplexer having inputs to receive the first and second storage;
   - an execution unit to receive and decode the compare instruction to compare at least two values identified by the compare instruction to produce a true condition if the compare is successful and then to receive the branch instruction to assert a bypass control signal that is coupled to the multiplexer to select the target instruction for input to the pipeline when the condition is true, the execution unit including a plurality of pipeline stages including an decode stage to decode the instructions; and
   - wherein a first conditional branch instruction, when applied to the decode stage, causes the bypass control signal to be asserted.

7. The digital processor of claim 6, wherein the multiplexer selects the next in-line instruction when the bypass control signal is not asserted.

8. The digital processor of claim 7, where the execution unit operates to receive a second branch instruction, the pipeline stages including an execution stage that receives the second branch instruction to assert the control signal when the condition is true.

9. A digital processor operating to decode and execute instructions, including compare and branch instructions, the digital processor comprising:
   - a first storage for holding a target instruction;
   - a second storage for holding a next in-line instruction;
   - a multiplexer having inputs to receive the first and second storage;
   - an execution unit to receive and decode the compare instruction to compare at least two values identified by the compare instruction to produce a true condition if the compare is successful and then to receive the branch instruction to assert a bypass control signal that is coupled to the multiplexer to select the target instruction for input to the pipeline when the condition is true; and
   - a pre-decode unit to couple the first and second storage to the multiplexer to perform predecoding on the target instruction and the next in-line instruction.

* * * * *